UNITED STATES PATENT OFFICE 2,216,660

PROCESS OF RETARDING FAT BLOOM AT THE SURFACE OF CHOCOLATE AND CHOCOLATE-COATED PRODUCTS, AND THE RESULTING PRODUCT

Leon Russell Cook and John Harding Light, Lititz, Pa., assignors to Wilbur-Suchard Chocolate Company, Inc., Lititz, Pa., a corporation of Pennsylvania No Drawing. Application January 30, 1939, Serial No. 253,684

9 Claims. (Cl. 99—23)

Our invention relates to the treatment of cocoa-butter to raise the melting and softening points thereof, and to the treatment of cocoa-butter-containing products, such as chocolate, to prevent or retard the fat-bloom in such products.

Cocoa-butter, alternatively known as cacao-butter, is the fat present in the seeds of the cacao (theobroma) tree, and is widely used in confectionery, cosmetics, and pharmaceutical preparations. Its relatively low melting and softening points are disadvantageous in many instances, resulting in undue softening of the products when exposed to summer heat or to the heat of the human body. The difficulty encountered, due to the relatively low melting and softening points of cocoa-butter, manifests itself particularly in confectionery products having chocolate at the surface thereof, since the well-known fat-bloom is the result thereof. This fat-bloom is characterized by a white film at the surface of the chocolate, and is encountered particularly when the temperature of the surroundings has reached a relatively high range, such as is the case in the summer months, or in semi-tropical or tropical climates. The fat-bloom may appear at the end of two weeks or more at a temperature of 75° F. and in four or five days at a temperature of 85° F. At higher temperatures, the appearance of fat-bloom is even more rapid. More difficulty is encountered with fat-bloom when the source of the chocolate is a soft cacao bean than when harder beans are used.

Cocoa-butter comprises a mixture of the glycerides of the fatty acids, such as palmitic, stearic and oleic acid, and for the most part the glycerides are mixed products where a single glycerol radical is combined with the radicals of at least two different fatty acids. Certain of these glycerides of the mixture have a sufficiently high melting point so that they do not melt at the temperatures to which the products are subjected; but others, and specifically those that have an oleic acid radical, melt at a relatively low temperature. Fat-bloom results when relatively high temperatures are encountered, due to the fact that the glycerides of higher melting point which were dissolved in the glycerides of lower melting point upon solidification of the chocolate infiltrate to the surface of the product when the lower glycerides melt, and re-crystallize from their super-cooled state upon the surface in the form of a characteristic white film upon subsequent lowering of the temperature, or maintenance at a temperature lower than that of the freezing point of the higher melting point glycerides.

Various attempts involving the inclusion of extraneous substances with the product have been made to prevent or retard fat-bloom. In contradistinction to these suggestions, the nature of the low melting point glycerides is chemically altered by the present invention, so that fat-bloom is effectively prevented or retarded.

One object of the present invention is to provide a process by which cocoa-butter may be treated, whether the cocoa-butter is relatively pure, or whether it is present with other materials, such as the constituents with which it is associated in the cocoa bean or in chocolate products, to raise the melting and softening points thereof, with the result that the cocoa-butter will remain as a solid at somewhat higher temperatures, thereby overcoming a disadvantage now present in such products.

Another object is to provide a process by which fat-bloom at the surface of chocolate-coated products may be prevented or retarded even when the temperature to which the product is subjected becomes relatively high.

Still another object is to provide cocoa-butter and cocoa-butter-containing products, such as confectionery with chocolate at the surface thereof, possessing the advantageous properties herein described.

Other objects will be apparent from a consideration of the specification and claims.

The present invention contemplates the treatment of cocoa-butter, either per se, or in the presence of other materials, with a substance which catalytically causes a re-arrangement of the oleic acid radical (isomerism), converting at least a portion of the oleic acid radicals of the glycerides into elaidic acid radicals. As previously stated, the glycerides containing oleic acid radicals have a lower melting point than the other glycerides present, and the melting point of the mixture of glycerides is, therefore, relatively low. By the conversion of the oleic acid radicals into elaidic acid radicals, glycerides of a higher melting point result and the melting point of the cocoa-butter is consequently raised appreciably. The treatment when applied to chocolate chemically alters sufficient of the low melting glycerides of the cocoa-butter to prevent or retard the objectionable fat-bloom of the product without deleteriously affecting the eating qualities thereof.

In the case of cocoa-butter, per se, or of cocoabutter-containing products other than confectionery, the treatment may convert substantially all of the oleic acid radicals into elaidic acid radicals, resulting in a mixture of glycerides of the highest melting point possible, or the treatment may convert only a portion of the oleic acid radicals, the amount in any given example converted determining the increase in the melting and softening points of the product. In the case of confectionery, whether the chocolate is present on the surface or in the interior of the products, it is not desirable to increase the melting point of the cocoa-butter contained therein substantially above body heat, since it is desirable to have the cocoa-butter melt at or below the temperature encountered when the confectionery is eaten. If the melting point of the confectionery is appreciably above that of the temperature of the human body, a waxy body of unpleasant consistency results. Since, however, the temperature at which the confectionery is stored rarely reaches 98° F.–100° F., it is not necessary in order to avoid fat-bloom to raise the melting point of the cocoa-butter to this point. Usually the amount of oleic acid radicals converted by the process will depend upon the temperature conditions to which the confectionery will be subjected.

Since, as previously stated, cocoa-butter contains the glycerides of several fatty acids with wide variations in melting points; and since the percentages of these glycerides are not the same in different samples of cocoa-butter, the melting point of the butter varies considerably in different samples, for example, samples of cocoa-butter with melting points varying from 80° to 90°–92° F. have been obtained. In the case of chocolate, the apparent melting point and softening point are in the neighborhood of four or five degrees higher than those of the cocoa-butter contained therein. Furthermore, the variations in the differences in the melting and softening points of the chocolate as compared to those of the butter contained therein will depend upon the type of chocolate under consideration. For instance, a chocolate that has a high liquor content and a low amount of added cocoa-butter will not melt, soften or acquire fat-bloom quite as readily as a chocolate of low liquor content and a higher percentage of added cocoa-butter.

Referring to the effect on the melting point of cocoa-butter by the transformation of any given percentage of oleic acid radicals to elaidic acid radicals, the original per cent of oleic acid radicals will govern the rise in the melting point of the whole. This is true even when substantially all of the oleic acid radicals are isomerized; because a butter which has, for instance, an oleic acid content of 35% will have a higher melting point when the oleic acid radicals are isomerized to elaidic acid radicals, than will a butter which originally has an oleic acid content of 40%. In a specific case, one sample of cocoa-butter which had an oleic acid content of 38% and a melting point of 87.26° F., had its melting point increased by the process herein described to 89.60° F. when 26% oleic acid remained unconverted, and to 111.5° F. when substantially all of the oleic acid radicals had been isomerized to elaidic acid radicals. The softening points of this sample of butter were respectively: 82.94° F., 86.90° F., and 111.0° F. It will be noted that the softening point rise was greater for the same degree of isomerization than that of the melting point. This is important because, as previously stated, it is the low-melting fraction of the butter which when melted causes softening of the butter as a whole, and also the grayness or fat-bloom on the surface of the chocolate. In another case, a sample of cocoa-butter having an oleic acid content of 34.5% and a melting point of 89.6° F. had its melting point increased to 91.40° F. when 26% of oleic acid remained and to 116° F. when substantially all of the oleic acid radicals had been isomerized. It is to be noted that although the melting point of this second sample was 91.40° F. when it contained 26% of oleic acid as contrasted with 89.60° F. for the first sample with the same percentage of oleic acid, the softening points of the two were almost identical, namely 86.54° F. accompanying the 91.40° F. melting point and 86.9° F. accompanying the 89.6° F. melting point.

It can be seen from the above discussion that the amount of oleic acid radicals that should be converted in order to give a particular increase in the melting point cannot be definitely stated. However, it can be said in many instances that to obtain a melting point of 98° F. in cocoa-butter, it is necessary to reduce the oleic acid content to about 14%. At this point the softening will begin at approximately 91° F. To obtain a melting point of about 91° F.–93° F. in cocoa-butter, which is equivalent to a melting point of about 96° F.–98° F. in a dark chocolate from a cocoa-butter whose melting point was originally about 86° F., it is generally necessary to reduce the oleic acid content to around 20%–25%. At this point, softening will occur at approximately 87° F.–89° F. in cocoa-butter and at about 91° F. to 93° F. in a dark chocolate. Since as previously stated, the amount of oleic acid radicals varies in various samples of cocoa-butter, it will be understood that the amount which it is necessary to convert to obtain given melting and softening points in cocoa-butter or chocolate will depend upon the particular sample, and that the above figures are approximate and refer only to the specific sample noted.

The conversion of at least a portion of the low melting point glycerides of cocoa-butter into higher melting point glycerides may be brought about by treatment of the cocoa-butter, either per se, or in the presence of other materials, such as the constituents with which it is associated in the cocoa bean or in chocolate products, with any reagent capable of converting the oleic acid radical into the elaidic acid radical. The various oxides of nitrogen and sulphur dioxide are examples of the catalytic substances that are applicable for use. Of these, nitrous oxide ($N_2O$) and sulphur dioxide ($SO_2$) are preferred, and since nitrous oxide has no odor and sulphur dioxide an unpleasant one, the use of the first named compound is recommended. In place of these compounds, nitric oxide (NO) and nitrogen peroxide ($NO_2$ or $N_2O_4$) may be used, the former in the presence of air being converted into the latter, or at least existing only in equilibrium with the latter. The oxide in the form of a gas may be brought into contact with the cocoa-butter, and the use of the gas is preferred since no adulterating material is added to the product, the gas being expelled by heat and aeration, if desired, after its catalytic action is completed. If desired, however, a compound, or compounds, may be added to the cocoa-butter or cocoa-butter-containing material, which compound, or compounds, will furnish an oxide of the type contemplated, although in this case it may possibly be the anion corresponding to the oxide that functions in the process of conversion, but if it does, it is included herein within the term "oxide." Examples of reactants which may be employed are a bisulphite in the presence of heat; dilute sulphuric acid in the presence of head and/or a metallic catalyst for which the metal sides of the container may serve; ammonium nitrate in the presence of heat; nitric acid plus starch or other reducing agent, including material associated with the cocoa-butter; nitric acid plus heat; a sulphite, bisulphite or nitrate in the presence of an acid, including any acid encountered in the product being treated; and the like.

Since, as previously stated, the conversion of the low melting point glycerides into higher melting point products may be considered to be a rearrangement of the oleic acid radical caused by catalysis, the amount of oxide required is relatively small. Although in any particular instance the amount required depends upon the type of product being treated, the amount of oleic acid radicals it is desired to convert, the amount of oleic acid radicals present, the temperature, and the efficiency of contact between the product treated and the oxide, one desirous of practicing the process will have no difficulty in determining, in view of the particular factors existing, the amount of oxide required.

The oxide, furnished either in the form of a gas or by reactants, may be brought into contact with the material to be treated in any suitable apparatus, and the product is heated to a temperature at which the lower melting point fractions at least are melted. It is advantageous to stir or agitate the material so as to expose it to the action of the oxide. If the material is to be treated with a gas, the material is preferably placed in a closed container, and the product to be treated is fractionally crystallized to solidify the higher melting point fractions before the gas is brought into contact with the product. In this case, the gas is concentrated in that part of the cocoa-butter maintained above its melting point so that good contact is afforded between the gas and that part of the butter which it is desired to isomerize. The gas is advantageously admitted to the container at a point where maximum contact with the material will be afforded.

The material treated may be any product obtained during the processing of the cacao from the raw cacao bean to cocoa-butter on the one hand, and to chocolate just prior to the final hardening of the product on the other. Thus, the process may be carried out on the raw beans or nibs, or on the partially or completely roasted beans or nibs. Since the roasting is usually conducted in a closed container, the treatment advantageously may take place during the roasting or upon completion of the step and prior to the removal of the roasted product from the container. Excellent results are also obtained when the chocolate liquor resulting from the grinding and melting of the roasted nibs is treated. The various steps described above are usually followed whether chocolate or cocoa-butter is to be prepared. In the manufacture of cocoa-butter, the liquor is pressed to extract the oil which is solidified to form cocoa-butter, while the solid material obtained in the form of a cake is ground to form cocoa powder. This latter material, particularly if it contains a relatively high fat content, as well as the cocoa-butter itself, may be treated.

In the manufacture of chocolate, the liquor is placed in a mixer, and sugar, flavoring materials, and cocoa-butter if desired are added thereto, and the material (herein termed "chocolate paste") thereafter is subjected to the refining steps. If cocoa-butter has not been added with the sugar and flavoring material, it may be added in a step known as the conching step. The refined product, after conching, if that step is followed, is tempered, then molded to the desired form, and hardened. The process of conversion as contemplated herein may be carried out with any of these materials, and in any step prior to the final hardening step. In most instances, it will be carried out prior to the final molding step. Alternatively, sufficient cocoa-butter that has been treated by the process, may be added during the mixing, conching, or tempering steps to give a chocolate product possessing glycerides of a sufficiently high aggregate melting point, so that fat-bloom is retarded or prevented.

The following examples are illustrative of, but not limiting on, the invention:

Example I 500 pounds of raw cacao beans were placed in the usual heated cylindrical roaster, and 16 fluid ounces of nitric acid of a specific gravity of 1.415–1.42 and 2 quarts of water were added to the roaster. The damper was closed to allow steaming. After a treatment of about one-half hour, the damper was opened, and the roasting was completed. An analysis of the cocoa-butter extracted from a sample of the treated roasted beans showed that the oleic acid content dropped from 38% to 35%, the melting point being raised from 86° F. to 88° F., and the softening point from 83° F. to 84.5° F.

Example II

Raw cacao beans were placed in the usual heated cylindrical roaster and partially roasted in the usual manner. The beans were then cracked and fanned and 200 pounds of the resulting partially-roasted nibs were returned to the heated roaster. 4 fluid ounces of nitric acid of a specific gravity of 1.415–1.42 and 2 quarts of water were added to the roaster. The damper was closed to allow steaming. After treatment for about one-half hour, the damper was opened and the roasting was completed. An analysis of the treated nibs showed that the oleic acid content of the extracted cocoa-butter dropped from 40% to 38%, the melting point of the butter being raised from 84° F. to 85° F., and the softening point from 80° F. to 81° F.

Example II (a)

The process of Example II was followed except that 8 fluid ounces of the concentrated nitric acid of Example II and 2 quarts of water were employed, rather than the amount of nitric acid specified in Example II. In this case, the oleic acid content of the extracted cocoa-butter dropped to 36%; while the melting point of the butter rose to 86.5° F., and the softening point to 82.5° F.

Example II (b)

The process of Example II was followed except that 25 fluid ounces of the concentrated nitric acid of Example II and 2 quarts of water were employed, rather than the amount of nitric acid specified in Example II. In this case, the oleic acid content of the extracted cocoa-butter dropped to 26%, while the melting point of the butter rose to 91° F., and the softening point to 88% F.

Example II (c)

The process of Example II was followed except that 12 fluid ounces of sulphuric acid of a specific gravity of 1.835 and 2 quarts of water were added to 300 pounds of the partially-roasted nibs. In this case, the oleic acid content of the extracted cocoa-butter dropped to 37%, while the melting point of the butter rose to 85.7° F. and the softening point to 82° F.

Example II (d)

The process of Example II was followed except that 60 ounces by weight of nitrous oxide gas was passed into the roaster, following the addition of about 2 quarts of water to dampen the nibs. The oleic acid content of the butter extracted from the beans dropped from 38% to 30%, and the melting point of the butter rose from 85° F. to 90° F., and the softening point from 82° F. to 86° F. It is to be noted that an undetermined amount of the nitrous oxide gas escaped from the roaster.

Example III 150 pounds of liquor resulting from grinding the nibs were placed in a suitable open receptacle, and the liquor was cooled to 98° F.–100° F. 30 ounces by weight of nitrous oxide gas were pumped into this liquor over a period of 3 hours and the liquor was continuously stirred during this period. While the flow of nitrous oxide gas to the liquid was continuous, the gas was added at a very slow rate in order to prevent undue loss of gas. If a closed container were employed, the gas could be added at one time. An analysis of the extracted cocoa-butter showed that the oleic acid content dropped from 28% to 26%, and the melting point rose from 86° F. to 87.62° F., and the softening point from 82° F. to 85° F.

Example IV 500 pounds of cocoa-butter maintained at a temperature of 90° F. were placed in an open kettle under continuous agitation. The NO₂ and other gases liberated from heating 5 pounds of nitric acid of a specific gravity of 1.415–1.42 placed in a separate container were pumped into the cocoa-butter over a period of 4 hours. An analysis of the resulting butter showed that the oleic acid content dropped from 38% to 2%, while the melting point rose from 87.3° F. to 111.5° F., and the softening point from 82.9° F. to 111° F.

Example V 290 pounds of completed chocolate coating containing all of the usual ingredients incorporated therein, including the final additions of cocoa-butter, were placed in an open kettle and cooled to 95° F. 30 ounces by weight of nitrous oxide gas were pumped into the coating over a 3 hour period, during which time the coating was continuously stirred. An analysis of the extracted cocoa-butter showed that the oleic acid content dropped from 33% to 17%, while the melting point rose from 89.6° F. to 95.0° F., and the softening point from 82.94° F. to 87.44° F.

Example VI 300 pounds of chocolate coating of the type of Example V were cooled in a kettle to 95° F. and 6 ounces of sulphuric acid of a specific gravity of 1.835 were added to the coating, and the mixture stirred. The mixture was heated to 180° F. to break down the sulphuric acid, with the liberation of sulphur dioxide gas. The chocolate coating was then cooled to 95° F. and maintained at that temperature with constant agitation for 4 hours. An analysis of the extracted cocoa-butter showed that the oleic acid content of the butter dropped from 40% to 38%, while the melting point of the butter rose from 84° F. to 85.5° F., and the softening point from 80° F. to 82.5° F.

Example VI (a)

The process of Example VI was carried out except that 8 ounces of nitric acid of a specific gravity of 1.415–1.42 were added to the chocolate coating. In this case, the heat-treatment broke down the nitric acid, allowing the gas liberated therefrom to react. A sample of the extracted cocoa-butter showed that the oleic acid content dropped from 38% to 26%, while the melting point rose from 87.2° F. to 91.3° F., and the softening point from 82.4° F. to 86.8° F.

It will be obvious that considerable modification is possible in the various steps of the process and in the amount of oleic acid converted into elaidic acid without departing from the essential features of the invention.

We claim:

1. The process of retarding fat-bloom at the surface of chocolate and chocolate-coated products which comprises bringing into contact with at least a portion of the cocoa-butter of said product prior to the final hardening thereof an oxide selected from the group consisting of an oxide of nitrogen, sulphur dioxide, and converting by said oxide at least a portion of the oleic acid radical into the elaidic acid radical sufficient to raise the melting point of said cocoa-butter to reduce appreciably its tendency to recrystallize on the surface of said chocolate products but insufficient to raise it appreciably above body heat.

2. The process of claim 1 wherein the oxide employed is in the form of a gas.

3. The process of retarding fat-bloom at the surface of chocolate and chocolate-coated products which comprises bringing into contact with at least a portion of the cocoa-butter of said product prior to the final hardening thereof nitrous oxide gas, and converting at least a portion of the oleic acid radical into the elaidic acid radical sufficient to raise the melting point of said cocoa-butter to reduce appreciably its tendency to recrystallize on the surface of said chocolate products but insufficient to raise it appreciably above body heat.

4. The process of retarding fat-bloom at the surface of chocolate and chocolate-coated products which comprises bringing into contact with at least a portion of the cocoa-butter of said product prior to the final hardening thereof sulphur dioxide gas, and converting at least a portion of the oleic acid radical into the elaidic acid radical sufficient to raise the melting point of said cocoa-butter to reduce appreciably its tendency to recrystallize on the surface of said chocolate products but insufficient to raise it appreciably above body heat.

5. The process of retarding fat-bloom at the surface of chocolate and chocolate-coated products, which comprises bringing into contact during the roasting of at least a portion of the cacao beans furnishing chocolate to said product an oxide gas selected from the group consisting of an oxide of nitrogen, sulphur dioxide, converting by said oxide at least a portion of the oleic acid radical into the elaidic acid radical sufficient to raise the melting point of said cocoa-butter to reduce appreciably its tendency to recrystallize on the surface of said chocolate products but insufficient to raise it appreciably above body heat, and employing said treated product in the production of the chocolate product.

6. The process of retarding fat-bloom at the surface of chocolate and chocolate-coated products, which comprises bringing into contact with at least a portion of the cocoa-butter of said product at a stage in the process subsequent to the milling of the roasted nibs and prior to the molding of the product an oxide gas selected from the group consisting of an oxide of nitrogen, sulphur dioxide, converting by said oxide at least a portion of the oleic acid radical into the elaidic acid radical sufficient to raise the melting point of said cocoa-butter to reduce appreciably its tendency to recrystallize on the surface of said chocolate products but insufficient to raise it appreciably above body heat, and employing said treated product in the production of the chocolate product.

7. A chocolate product in which fat-bloom has been retarded having elaidic acid present sufficient to reduce appreciably the tendency of cocoa-butter to recrystallize on the surface of said chocolate product but insufficient to raise the melting point of said cocoa-butter appreciably above body heat.

8. The process of retarding fat-bloom at the surface of chocolate and chocolate-coated products, which comprises bringing into contact with the cocoa-butter of chocolate paste prior to the molding thereof into said product an oxide gas selected from the group consisting of an oxide of nitrogen, sulphur dioxide, and converting by said oxide at least a portion of the oleic acid radical into the elaidic acid radical sufficient to raise the melting point of said cocoa-butter to reduce appreciably its tendency to recrystallize on the surface of said chocolate products but insufficient to raise it appreciably above body heat.

9. The process of claim 8 wherein the entire content of cocoa-butter of said chocolate product is present in said chocolate paste when the process of said claim is applied.

LEON RUSSELL COOK.
JOHN HARDING LIGHT.